United States Patent
Serive

(10) Patent No.: US 12,491,175 B2
(45) Date of Patent: Dec. 9, 2025

(54) COMPOSITION CONTAINING CAROTENOIDS AND USE THEREOF FOR PROTECTING NEURONS AGAINST NEURODEGENERATION

(71) Applicant: Benoît Serive, Nantes (FR)

(72) Inventor: Benoît Serive, Nantes (FR)

( * ) Notice: Subject to any disclaimer, the term of this patent is extended or adjusted under 35 U.S.C. 154(b) by 920 days.

(21) Appl. No.: 17/766,391

(22) PCT Filed: Oct. 6, 2020

(86) PCT No.: PCT/FR2020/051750
§ 371 (c)(1),
(2) Date: Apr. 4, 2022

(87) PCT Pub. No.: WO2021/069828
PCT Pub. Date: Apr. 15, 2021

(65) Prior Publication Data
US 2023/0263765 A1 Aug. 24, 2023

(30) Foreign Application Priority Data
Oct. 9, 2019 (FR) ...................................... 1911184

(51) Int. Cl.
| | |
|---|---|
| *A61K 31/336* | (2006.01) |
| *A61K 31/047* | (2006.01) |
| *A61K 31/122* | (2006.01) |
| *A61K 36/02* | (2006.01) |
| *A61K 36/05* | (2006.01) |
| *A61P 25/00* | (2006.01) |

(52) U.S. Cl.
CPC .......... *A61K 31/336* (2013.01); *A61K 31/047* (2013.01); *A61K 31/122* (2013.01); *A61K 36/02* (2013.01); *A61K 36/05* (2013.01); *A61P 25/00* (2018.01); *A61K 2236/15* (2013.01); *A61K 2236/51* (2013.01); *A61K 2236/53* (2013.01)

(58) Field of Classification Search
CPC .................................................... A61K 31/336
See application file for complete search history.

(56) References Cited

U.S. PATENT DOCUMENTS 11,806,316 B2    11/2023   Pradelles et al.

OTHER PUBLICATIONS

Cho et al. "Recent advances in studies on the therapeutic potential of dietary carotenoids in neurodegenerative diseases" Oxidative Medicine and Ellular Longevity, vol. 2018, Apr. 16, 2018.
Soontornchaiboon et al. "Anti-Inflammatory Effects of Violaxanthin Isolated From Microalga Chlorella Ellipsoidea in Raw 264.7 Macrophages" Biol. Pharm. Bull., vol. 35, No. 7, Jul. 2012, pp. 1137-1144.
Latowski D et al. "Violaxanthin and diadinoxanthin cycles as an important photoprotective mechanism in photosynthesis" Russian Journal of Plant Physiology, Nauka/Interperiodica, MO, vol. 58, No. 6, Oct. 12, 2011, pp. 952-964.

*Primary Examiner* — Yong S. Chong
(74) *Attorney, Agent, or Firm* — Arrigo, Lee, Guttman & Mouta-Bellum LLP

(57) ABSTRACT

Composition containing carotenoid pigments of the xanthophyll family, characterized in that said pigments of the xanthophyll family comprise at least diadinoxanthin, or a $C_4$ to $C_{36}$ fatty acid ester of diadinoxanthin and/or violaxanthin, or a $C_4$ to $C_{36}$ fatty acid ester of violaxanthin, for use in the prevention or treatment of cognitive decline or neurodegenerative diseases.

9 Claims, 2 Drawing Sheets

COMPOSITION CONTAINING CAROTENOIDS AND USE THEREOF FOR PROTECTING NEURONS AGAINST NEURODEGENERATION

The present invention relates to the field of the compositions containing carotenoids, more particularly of the xanthophyll family, and use thereof in the prevention or treatment of cognitive decline or neurodegenerative diseases.

Carotenoids are natural pigments present in different organisms such as animals, plants, algae and microorganisms. Currently, over 800 carotenoids are clearly identified. In plants, these molecules allow them to collect light in order to carry out photosynthesis, and others allow their photoprotection, for dissipating the energy that is not used directly.

Among the carotenoids, carotenes and xanthophylls can be distinguished. Carotenes such as beta-carotene or lycopene are strictly hydrocarbon carotenoids, without any substituent in their structure. The xanthophylls (or oxycarotenoids), which belong to the second group, are molecules containing oxygen atoms.

Past research has shown for a number of years that alpha-carotene, beta-carotene, crocetin, crocin, beta-cryptoxanthin, lutein, lycopene, zeaxanthin, astaxanthin and fucoxanthin have a potential for preserving neurons from neurodegeneration. In particular, these molecules have antioxidant and anti-inflammatory activity and modulate autophagy; a cell death necessary for the elimination of the misfolded proteins or protein aggregates that are found in most of the neurodegenerative diseases.

Epidemiological research in humans has validated the results obtained in cell culture and on animals relating to the benefits of carotenoids for reducing the risk of neurodegenerative diseases (K. S. Cho et al., *Recent advances in studies on the therapeutic potential of dietary carotenoids in neurodegenerative diseases*. Oxidative Medicine and Cellular Longevity, vol. 2018, article ID4120458).

During their research and studies of the different carotenoid pigments originating from microalgae the inventor discovered, surprisingly, that particular molecules of the xanthophyll family had superior effects on the protection from cell death.

To this end, the present invention relates to a composition containing carotenoid pigments of the xanthophyll family, characterized in that said pigments of the xanthophyll family comprise at least one of the molecules of the following formula (I) or (II):

[Chem. 1]

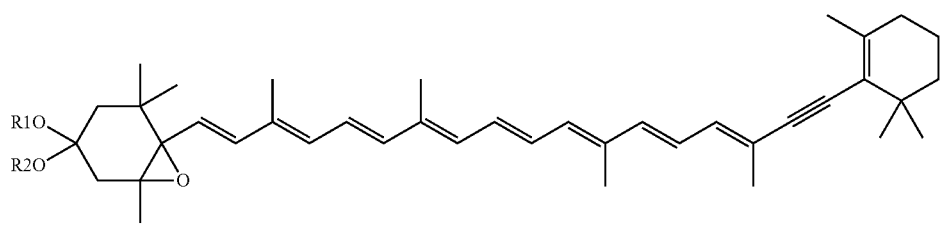
(I)

[Chem. 2]

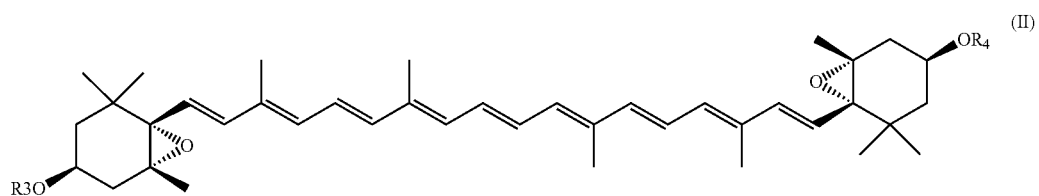
(II)

in which the R1, R2, R3 and R4 radicals, identical or different, are selected from hydrogen, a saturated or unsaturated, linear or branched hydrocarbon radical, such as a $C_1$ to $C_{36}$ alkyl radical, or the groups —OR1, —OR2, —OR3 or —OR4 are $C_4$ to $C_{36}$ fatty acid esters, preferably $C_4$ to $C_{28}$ fatty acid esters, for use in the prevention or treatment of cognitive decline or of neurodegenerative diseases.

According to a particular aspect of the invention, the molecule of the xanthophyll family of formula (I) is diadinoxanthin, or a $C_4$ to $C_{36}$ fatty acid ester of diadinoxanthin.

According to another particular aspect of the invention, the molecule of the xanthophyll family of formula (II) is violaxanthin, or a $C_4$ to $C_{36}$ fatty acid ester of violaxanthin.

Preferably, the fatty acid esters are $C_4$ to $C_{28}$ esters, more preferably $C_8$ to $C_{18}$ esters.

Said xanthophyll molecules can be extracted from marine or freshwater microalgae, marine macroalgae, cyanobacteria or bacteria. They can also originate from organic synthesis or hemisynthesis.

The xanthophyll molecules extracted from the marine or freshwater microalgae are preferred.

Advantageously, the xanthophyll molecules of formula (I) are extracted from euglenophyte algae of the Euglenozoa phylum, diatoms of the Bacillariophyta phylum, dinoflagellates of the Dinophyceae class, Haptophytes, Pelagophytes, Phaetothamniophytes, Dictyochophytes or Ochrophytes.

Advantageously, the xanthophyll molecules of formula (II) are extracted from algae of the phyla Chrysophytes, Eustigmatophytes, Synurophytes, Mesostigmatophytes, Chlorophytes, Prasinophytes, Chlorarachniophytes, Pinguiophytes, Raphidophytes, or extracted from the dinoflagellates, or from macroalgae.

In the event that said xanthophyll molecules of interest according to the invention are produced by microorganisms, the latter can be obtained by any suitable method, such as a method comprising the following steps:

Production in (photo) bioreactors, dishes or tanks;
Concentration by centrifugation or filtration;
Solid/liquid extraction such as for example microwave-assisted, by ball mill, by homogenizer, by using supercritical fluids, by pulsed electric field, or by enzymes;
Optionally, separation/pressing;
Filtration, such as for example tangential ultrafiltration;
Purification, such as for example by centrifugal partition chromatography or by high-performance liquid chromatography;
Evaporation and drying, then packaging.

Prior to the packaging, provision can be made for the incorporation of additives and other ingredients such as excipients, emulsifiers, bulking agents, thickeners, anti-caking agents, stabilizers, acidifiers, flavourings and other active ingredients, as well as homogenization of these formulations.

The xanthophyll molecules of formula (I) or (II) of the composition according to the invention can be obtained from microalgae, for example by means of a method (such as described in the publication by B. SERIVE et al., PLOS ONE 12 (2): e0171872, 2017), comprising the following successive steps:

i) grinding the microalgae and dispersion in ethanol in a ball mixer-grinder allowing the extraction of the xanthophylls,
ii) after elimination of said balls, centrifugation for recovering the supernatant,
iii) filtering the supernatant over a 0.2 µm filter,
iv) followed immediately by a separation and purification of the pigments by centrifugal partition chromatography or by high-performance liquid chromatography and UV detection of the eluted fractions,
v) drying and packaging.

According to a first embodiment of the invention, said composition can be used as a food supplement or as a nutritional supplement.

By nutritional supplement is meant herein any ingredient in the field of health nutrition or any composition used in specialized clinical nutrition.

The food supplement can be presented in the form of a premix, used for the preparation of a human food intake.

According to a second embodiment of the invention, said composition can be used as active substance in a medicament.

The composition according to the invention aims in particular to delay the development of neurodegenerative diseases, to limit their effects or to prevent the development thereof or of their symptoms. By neurodegenerative disease is meant herein, all of the diseases where the phenomenon of pathological cell death of the neurons and/or glial cells is implicated. The composition according to the invention can thus be used in particular in the prevention or the treatment of Alzheimer's disease, Parkinson's disease, epilepsy, learning disabilities/autism, spinocerebellar ataxia, multiple sclerosis, Lewy body dementia, Alexander disease, Alpers disease, multiple system atrophy, posterior cortical atrophy (Benson's syndrome), cortico-basal degeneration, progressive supranuclear palsy, Pick's disease, macrophagic myofasciitis, Huntington's disease, amyotrophic lateral sclerosis, Creutzfeldt-Jakob disease, or glaucomatous neurodegeneration such as primary open angle glaucoma.

The formulation is also particularly adapted to a preventative mode associated with cognitive decline, i.e. cell aging leading to neuronal death.

Said composition can comprise at least one additional element selected from:

the following vitamins: E, B3, B5, B6, H, B9 and B12;
the following trace elements and minerals: magnesium, iodine and selenium;
the following compounds: eicosapentaenoic acid (EPA), docosahexaenoic acid (DHA), and sunflower lecithin;
plant proteins;
an extract of blueberry or another plant;
the following carotenoids: astaxanthin, fucoxanthin, lutein, zeaxanthin, alpha-carotene, beta-carotene, crocetin, crocin, beta-cryptoxanthin and lycopene;
excipients, emulsifiers, bulking agents, thickeners, anti-caking agents, stabilizers, acidifiers and flavourings.

Moreover, owing to the nature of the molecules of the composition according to the invention and the antioxidant and anti-inflammatory properties of the ingredients of the composition, the benefits can also encompass use for the prevention or the treatment of age-related macular degeneration; diseases associated with death of the osteoclasts such as osteoporosis; for weight loss, obesity or hyperlipidaemia; for the prevention of ischaemia-reperfusion syndrome during organ transplantation (including the kidney); for the prevention of cancers such as cancer of the prostate, breast, liver, intestines, bladder, throat, mouth; melanoma, skin cancer; for the prevention or the treatment of mycoses; for the prevention or the treatment of schizophrenia; for the prevention or the treatment of skin diseases; for the prevention or the treatment of the inflammatory diseases; for the prevention or the treatment of type 2 diabetes; for the prevention or the treatment of nonalcoholic steatohepatitis (NASH).

The composition and the ingredients of which it is composed can also be used in cosmetic dermatology for enhancing beauty by protecting the skin against UV A and B radiation, by way of anti-wrinkle, anti-tyrosinase agent; for preventing the formation of oxidation free radicals that cause skin cell aging.

The composition according to the invention can be presented for example, non-limitatively, in the form of hard capsules, in the form of soft capsules, in the form of a liquid stick, in the form of a liquid, in the form of a tablet, in the form of gel, in the form of powder, in the form of drinkable ampoules, in injectable form, in dropper form.

BRIEF DESCRIPTION OF THE DRAWINGS

The invention will be well understood on reading the following description of embodiments, with reference to the attached drawings in which.

EXAMPLES

Example 1: pure molecules of diadinoxanthin and violaxanthin (marketed by SIGMA ALDRICH) as well as other xanthophyll molecules such as canthaxanthin, astaxanthin, diatoxanthin, fucoxanthin, fucoxanthinol, lutein and zeaxanthin were tested.

Violaxanthin can be extracted from *Chlorella vulgaris* or from *Tetraselmis suecica*. Diadinoxanthin can be extracted from the microalgae *Odontella aurita* or *Isochrysis galbana*.

The HT22 neuronal cells (mouse hippocampus neuronal line) were treated for two hours with 50 μM of pigment, followed or not by the addition of 10 mM glutamate for 24 hours at 37° C. Cell viability (in %) was measured by an MTS test (by means of a CellTiter 96®Aqueous non-Radioactive Cell Proliferation Assay kit from Promega). The values shown in FIG. 1 are the mean±standard deviation (n=3), ★P<0.05; ★★P<0.01; ★★★P<0.001 with respect to the untreated cell control. #P<0.05; ###P<0.001 with respect to the glutamate-induced cell control.

These results show the non-toxic effect at 50 μM of most of the pigments tested (white rectangles) and the protective effect at over 50% of the diadinoxanthin and the violaxanthin against the cytotoxicity of glutamate on these HT22 neuronal cells (black rectangles). The morphology of the cells was obtained by INCUCYTE® S3.

Figure 1:
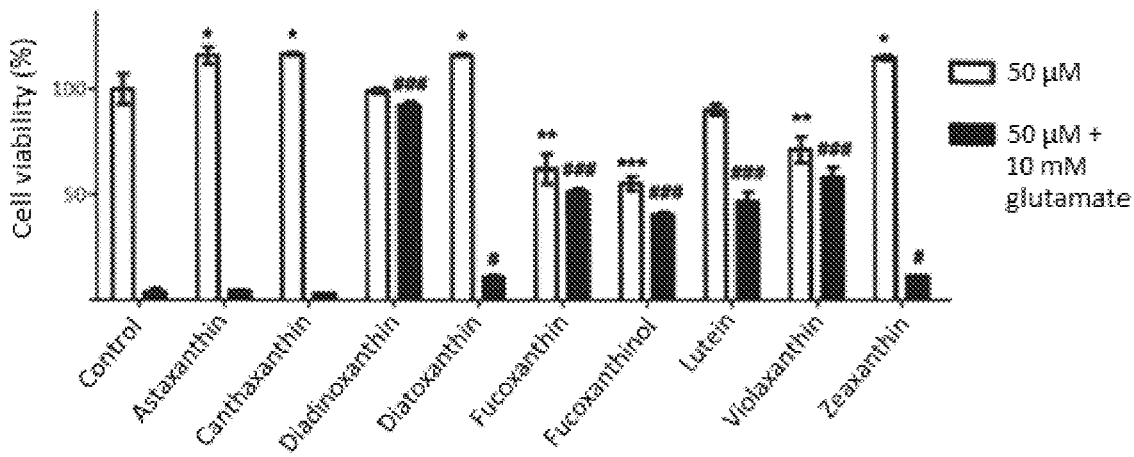
FIG. 1 is a diagram showing the cell viability of HT22 neuronal cells treated either with 50 µM of different xanthophyll molecules (white rectangles) for two hours followed by cell death induced by 10 mM glutamate, after incubation over 24 hours at 37° C. (black rectangles)

It can thus be seen that the diadinoxanthin and violaxanthin pigments are non-toxic and generate a protective effect on cell death of the HT22 neuronal cells induced by glutamate at 10 mM (FIG. 1).

Example 2: following the interesting results given in Example 1 for diadinoxanthin and the violaxanthin, dose-response tests between 1 and 50 M on the same HT22 cell model induced by glutamate (10 mM) were conducted.

Figure 2:
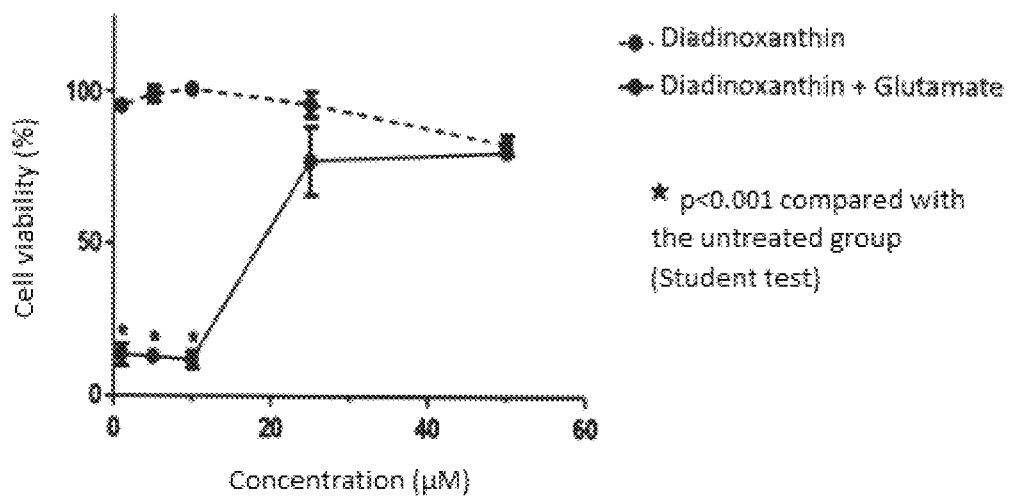
FIG. 2 is a graph showing cell viability in percentages as a function of the concentration in µM of diadinoxanthin alone (dotted line) and diadinoxanthin in the presence of glutamate (solid line)
Figure 3:
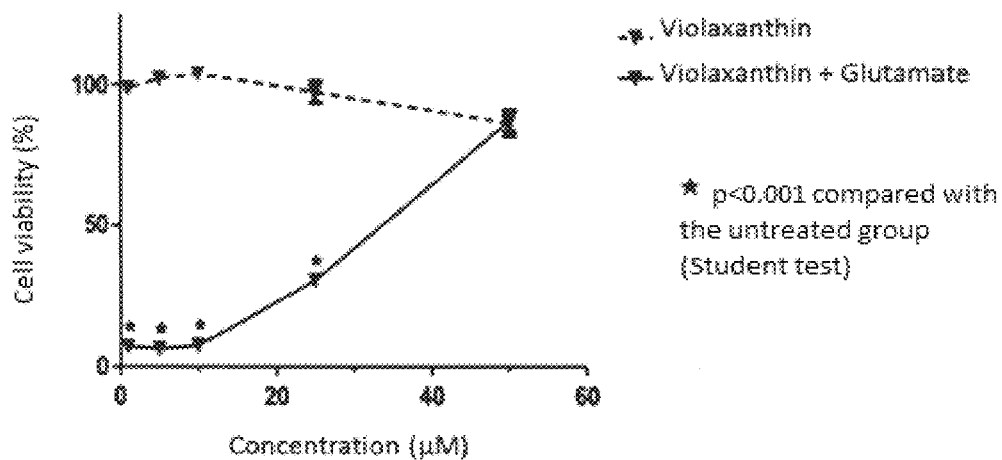
FIG. 3 is a graph showing cell viability in percentages as a function of the concentration in µM of violaxanthin alone (dotted line) and violaxanthin in the presence of glutamate (solid line)
Figure 4:
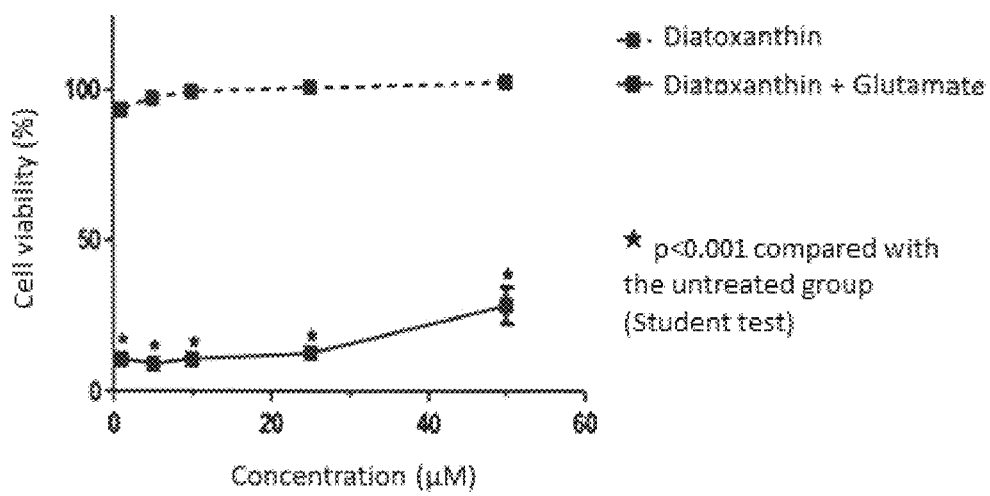
FIG. 4 is a comparative example showing cell viability in percentages as a function of the concentration in UM of diatoxanthin alone (dotted line) and diatoxanthin in the presence of glutamate (solid line).

The HT22 cells were treated for 2 hours either with diadinoxanthin (FIG. 2) or violaxanthin (FIG. 3) or diatoxanthin (comparative test shown in FIG. 4) at different concentrations. For each of the concentrations, cell death was then induced by glutamate (10 mM) for 24 hours at 37° C. Cell viability (in %) was measured by an MTS test. The values shown are the mean±standard deviation (n=3).

The EC50 (half maximal effective concentration) is the concentration at which a molecule induces a response halfway between the baseline and the maximum effect after a certain exposure time thereof. This determines its efficacy. For diadinoxanthin the EC50 value is 22 μM and that of violaxanthin is 28 μM.

These results clearly demonstrate that these two molecules protect neurons against cell death, this surprising effect being greater than that obtained by the other xanthophyll molecules already validated on animals for reducing the risk of neurodegenerative diseases (Cho et al., publication cited above).

The invention claimed is:

1. A method for the treatment of progressive supranuclear palsy in a patient comprising administering to the patent a medicament containing carotenoid pigments of the xanthophyll family, characterized in that said pigments of the xanthophyll family comprise at least one of diadinoxanthin, or a $C_4$ to $C_{36}$ fatty acid ester of diadinoxanthin.

2. The method of claim 1, characterized in that said pigments of the xanthophyll family comprise diadinoxanthin.

3. The method of claim 1, characterized in that the xanthophyll molecules are extracted from marine or freshwater microalgae, marine macroalgae, cyanobacteria or bacteria.

4. The method of claim 1, characterized in that said pigments are extracted from euglenophyte algae of the Euglenozoa phylum, diatoms of the Bacillariophyta phylum, dinoflagellates of the Dinophyceae class, Haptophytes, Pelagophytes, Phaetothamniophytes, Dictyochophytes or Ochrophytes.

5. The method of claim 1, characterized in that it comprises at least one additional element selected from:
 the following vitamins: E, B3, B5, B6, H, B9 and B12;
 the following trace elements and minerals: magnesium, iodine and selenium;
 the following compounds: eicosapentaenoic acid (EPA), docosahexaenoic acid (DHA), and sunflower lecithin;
 plant proteins;
 an extract of blueberry or another plant;
 the following carotenoids: astaxanthin, fucoxanthin, lutein, zeaxanthin, alpha-carotene, beta-carotene, crocetin, crocin, beta-cryptoxanthin and lycopene;
 excipients, emulsifiers, bulking agents, thickeners, anti-caking agents, stabilizers, acidifiers and flavourings.

6. The method of claim 1, wherein the medicament is in the form of a hard capsule, a soft capsule, a liquid stick, a liquid, a tablet, a gel, a powder, a drinkable ampoules, an injectable form or a dropper form.

7. The method of claim 1, characterized in that said pigments of the xanthophyll family further comprise at least one of the molecules of the following formula (II)

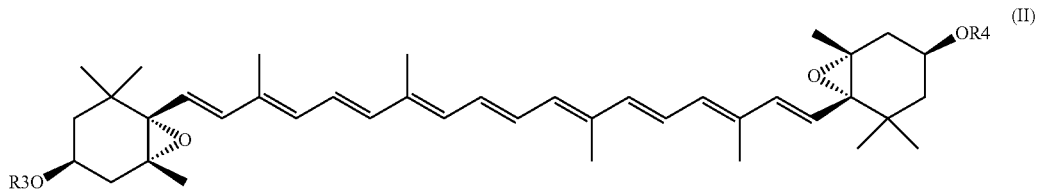

in which the R3 and R4 radicals, identical or different, are selected from hydrogen, a saturated or unsaturated, linear or branched hydrocarbon radical, such as a $C_1$ to $C_{36}$ alkyl radical, or the groups —OR3 or —OR4 are $C_4$ to $C_{36}$, preferably $C_4$ to $C_{28}$, fatty acid esters.

8. The method of claim 7, characterized in that the xanthophyll molecules of formula (II) are extracted from algae of the phyla Chrysophytes, Eustigmatophytes, Synurophytes, Mesostigmatophytes, Chlorophytes, Prasinophytes, Chlorarachniophytes, Pinguiophytes, Raphidophytes, or extracted from the dinoflagellates, or from macro-algae.

9. The method of claim 7, characterized in that the molecule of the xanthophyll family of formula (II) is violaxanthin, or a C4 to C36 fatty acid ester of violaxanthin.

* * * * *